March 4, 1930.  E. R. MAISON  1,749,146
GUIDE FOR CABLES AND THE LIKE
Filed Jan. 14, 1929
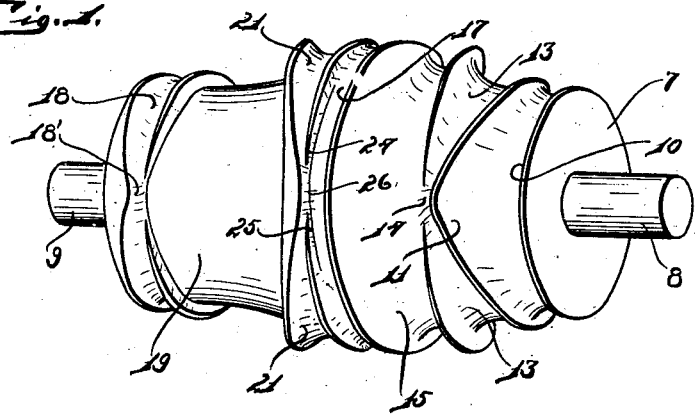
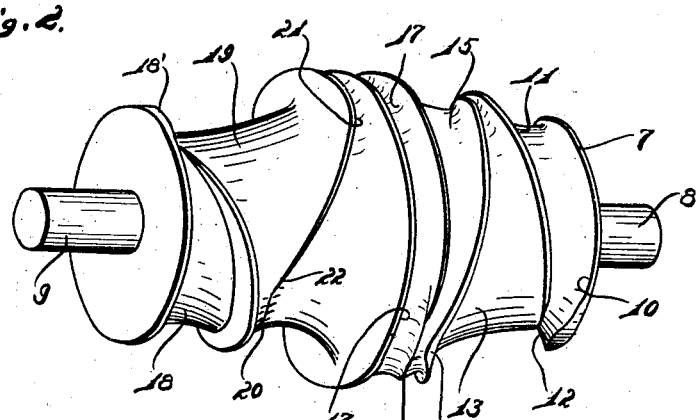
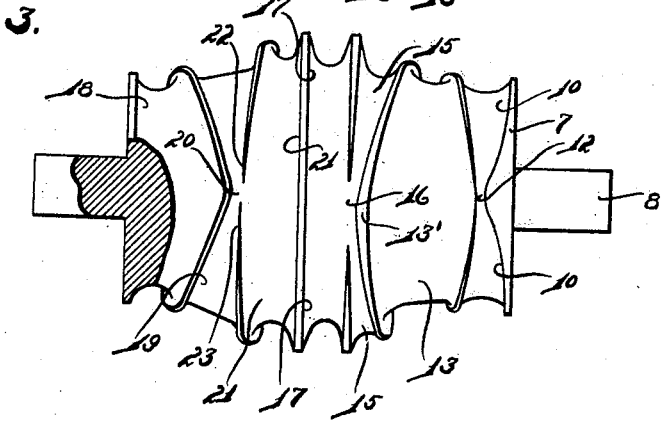
INVENTOR.
Edmund R. Maison.
BY
Thos. Donnelly
ATTORNEY.

Patented Mar. 4, 1930

1,749,146

UNITED STATES PATENT OFFICE

EDMUND R. MAISON, OF MOUNT CLEMENS, MICHIGAN

GUIDE FOR CABLES AND THE LIKE

Application filed January 14, 1929. Serial No. 332,271.

My invention relates to a new and useful improvement in a guide for cables and the like adapted for use in positions where pulleys and similar devices are provided for engagement with a cable or other similar cord or flexible member traveling thereover.

It is an object of the present invention to provide a roller bearing of this class which will, upon engagement of the cord thereon and traveling of the same thereover, direct the cord to the center of the roller regardless of the direction of travel of the cord thereover.

It is another object of the present invention to provide a device of this class which will be simple in structure, economical of manufacture and highly efficient in use.

Other objects will appear hereinafter.

The invention consists in the combination and arrangement of parts hereinafter described and claimed.

The invention will be best understood from a reference to the accompanying drawings which form a part of this specification, and in which, Fig. 1 is a perspective view of the invention.

Fig. 2 is a perspective view of the invention taken from the side opposite to the side from which Fig. 1 is taken.

Fig. 3 is a side elevational view of the invention turned 90 degrees to the perspective view illustrated in Fig. 2.

The invention comprises a roller 7 which is, as shown in the drawings, preferably formed of smaller dimensions at its end than in its center although for a practical embodiment of the invention as the description will disclose, the roller may be of the same diameter throughout its length. Projecting outwardly from opposite sides of the rollers are trunnions 8 and 9 which may also indicate a shaft projected through the roller. Formed on the periphery of the roller is a groove 10 which is enlarged in area as at 11 and which opens as at 12 to an enlarged portion 13' of an adjacent groove, 13. This groove 13 opens as at 14 into the enlarged portion 15 of an adjacent groove which in turn opens as at 16 into the central groove 17. On the opposite side of the central groove 17 the construction is as already described. A groove 18 is provided with the inwardly projecting shoulder on its inner face as at 18' and this groove 18 opens at this point into the enlarged portion 19 of the adjacent groove, the inner face of this groove being inclined to the point 20 at which the side walls of the adjacent groove 21 terminate as at 22 and 23, the inner walls of this adjacent groove terminating at 24 and 25 at opposite sides of the point 26 at which the opposite wall of the groove 21 inclines inwardly so that the groove 21 opens into the groove 17. The construction is such that the wide portions of adjacent grooves are spaced apart 90 degrees and such that each outer groove communicates with the next inner groove at a point 90 degrees from the point of communication of the inner groove with the next inner groove. By having the side walls terminate at the points indicated, a cable riding over the roller regardless of the direction of rotation of the roller will be forced into the inwardly succeeding grooves until the cable rides in the center groove 17.

With a roller constructed in this manner a cable is quickly brought to the center groove 17 when the cable is in engagement with the periphery of the roller.

The device is quite useful in various ways and particularly in guiding a cable which is passing over a roller such as is commonly used on winches, steam shovels, etc.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A roller of the class described having a plurality of peripheral grooves; adjacent grooves communicating with each other, said grooves being directed spirally of the roller toward a central groove formed therein.

2. A roller of the class described having a plurality of peripheral grooves; adjacent grooves communicating with each other, said grooves being directed spirally of the roller toward a central groove formed therein, said central groove being formed in a plane extended vertically to the axis of the roller.

3. A roller of the class described having a plurality of peripheral grooves formed thereon, each of said grooves having a portion of widened area and a portion of restricted area, said groove communicating at its portion of restricted area with the widened area portion of an adjacent groove.

4. A roller of the class described having a plurality of peripheral grooves formed thereon, each of said grooves having a portion of widened area and a portion of restricted area, said groove communicating at its portion of restricted area with the widened area portion of an adjacent groove, said groove being spirally directed on said roller toward a centrally located groove.

5. A roller of the class described having a central groove formed thereon lying in a plane vertical to the axis of said roller, said roller having a plurality of peripheral grooves formed at opposite side of said central groove; adjacent groove at opposite sides of said central groove communicating with each other at predetermined positions, the side walls of said groove at opposite sides of said central groove being spirally directed relatively to said roller for directing a cable rolling thereover inwardly to and onto said central groove regardless of the direction of rotation of said roller.

6. A roller of the class described having a central peripheral groove formed thereon, said roller having a plurality of peripheral grooves formed at opposite sides of said central groove communicating with each other at predetermined positions, the side walls of said groove at opposite sides of said central groove being spirally directed relatively to said roller for directing a cable rolling thereover inwardly to and onto said central groove regardless of the direction of rotation of said roller.

7. A roller of the class described having a central peripheral groove and provided at opposite sides of said central groove with a plurality of inner communicating spirally directed peripheral grooves, the side walls of said grooves being inclined and broken at predetermined intervals for directing a flexible body traveling over said roller onto said central groove regardless of the direction of rotation of said roller.

8. A roller of the class described comprising: a rotatable body having a central groove formed on its periphery lying on a plane at right angles to the axis of said body and provided on its periphery at opposite sides of said central groove with a plurality of peripheral grooves, each provided with a restricted area portion and with a widened area portion, each groove communicating at its restricted area portion with the next inwardly positioned groove.

In testimony whereof I have signed the foregoing specification.

EDMUND R. MAISON.